US007858946B2

United States Patent
Rohde

(10) Patent No.: US 7,858,946 B2
(45) Date of Patent: Dec. 28, 2010

(54) ENERGY DISPERSIVE X-RAY I-FET SDD DETECTOR APPLIANCE AND A METHOD FOR PULSED RESET NEUTRALIZATION OF ACCUMULATED CHARGES WITHIN AN ENERGY DISPERSIVE X-RAY I-FET SDD DETECTOR APPLIANCE

(75) Inventor: Martin Rohde, Berlin (DE)

(73) Assignee: Bruker Ax Microanalysis GmbH, Berlin (DE)

( * ) Notice: Subject to any disclaimer, the term of this patent is extended or adjusted under 35 U.S.C. 154(b) by 168 days.

(21) Appl. No.: 12/015,702

(22) Filed: Jan. 17, 2008

(65) Prior Publication Data

US 2008/0217543 A1  Sep. 11, 2008

Related U.S. Application Data

(60) Provisional application No. 60/885,411, filed on Jan. 18, 2007.

(51) Int. Cl.
*H01L 27/144* (2006.01)
(52) U.S. Cl. .................................. 250/370.09
(58) Field of Classification Search ............ 250/370.01, 250/370.08, 370.09, 370.14; 257/192, 225, 257/229, 231
See application file for complete search history.

(56) References Cited

U.S. PATENT DOCUMENTS

| 7,339,175 | B1 * | 3/2008 | Drummond et al. ..... | 250/370.01 |
|---|---|---|---|---|
| 7,547,889 | B2 * | 6/2009 | Lehmann et al. ....... | 250/370.01 |
| 7,554,091 | B2 * | 6/2009 | Drummond et al. ..... | 250/370.09 |
| 2005/0285018 | A1 * | 12/2005 | Kiuru et al. ............ | 250/214 R |
| 2006/0086906 | A1 * | 4/2006 | Kiuru ..................... | 250/370.01 |

* cited by examiner

*Primary Examiner*—David P Porta
*Assistant Examiner*—David S Baker
(74) *Attorney, Agent, or Firm*—Norris McLaughlin & Marcus, P.A.

(57) ABSTRACT

The present invention is directed to an energy dispersive X-ray detector appliance and a method for pulsed reset of said appliance. The present invention provides a ramp-and-neutralize cycled I-FET SDD in which the voltage dependency and nonlinearity due to the integrated FET is reduced via a compensation circuit to a level that can be handled by a correction circuit. The correction circuit does not substantially add noise or other kinds of erroneous signals. Accordingly, the appliance comprises a silicon drift detector with internal field effect transistor I-FET SDD, a compensation circuit for compensating nonlinearities in the I-FET SDD; and a neutralizing circuit adapted to neutralize accumulated charges in I-FET SDD comprising means for pulsed reset of the detector.

18 Claims, 2 Drawing Sheets

ENERGY DISPERSIVE X-RAY I-FET SDD DETECTOR APPLIANCE AND A METHOD FOR PULSED RESET NEUTRALIZATION OF ACCUMULATED CHARGES WITHIN AN ENERGY DISPERSIVE X-RAY I-FET SDD DETECTOR APPLIANCE

PRIORITY INFORMATION

This application claims priority from provisional application Ser. No. 60/885,411 filed Jan. 18, 2007.

FIELD OF THE INVENTION

The invention relates to an energy dispersive X-ray silicon drift detector appliance with an integrated field effect transistor and its method of driving, more specifically and an energy dispersive X-ray silicon drift detector appliance with an integrated field effect transistor adapted for pulsed reset neutralization of accumulated charges within the appliance.

BACKGROUND OF THE INVENTION

Energy dispersive x-ray spectroscopy (EDS) is a spectroscopic technique predominantly employed in the chemical analysis of specimen. It is based on the investigation of interactions between a high energy beam of particles such as electrons or protons or a beam of x-rays and matter resulting in the release of x-rays from the specimen. The x-ray released is then detected and analyzed by an energy dispersive spectrometer. An EDS setup typically employs a beam source, an X-ray detector; a pulse processor; and an analyzer. A detector converts X-ray energy into voltage signals, which is sent to a pulse processor measuring the signals and passing them onto an analyzer for data display and analysis.

Conventional solid state X-rays detectors usually comprise a semiconductor crystal, such as silicon drifted with lithium (Si(Li)) or high purity germanium (HpGe). Semiconductor detectors measure radiation by means of the number of charge carriers, i.e. free electrons and holes, set free in the detector being arranged between two electrodes. Under the influence of an electric field across the electrodes, the electrons and holes travel to the electrodes, where they result in a pulse, which can be measured. The number of electron-hole pairs is proportional to the energy transmitted by the radiation to the semiconductor.

Silicon drift detectors become more and more popular as x-ray detectors. They provide a cost-effective and high resolving power radiation measurement. Unlike conventional X-ray detectors, such as Si(Li)s, they do not need to be cooled with liquid nitrogen and provide a better noise characteristic and consequently improved energy resolution. Silicon drift detectors consist of a high-resistivity silicon chip where electrons are driven to a small collecting anode. The advantage lies in the extremely low capacitance of this anode allowing very high throughput.

However, as x-ray quanta continue to impinge on the semiconductor crystal, charge accumulates on the electrodes in a ramp-like manner, which eventually saturate. In order to prevent saturation of the electrodes, the accumulated charge must be neutralised, either continuously or by short discharge pulses after which always a new measurement period or ramp can start. With pulsed reset, the detector operation is thus divided in time in (a) a virtually undisturbed measuring period and (b) a possibly noisy reset period.

Pulsed charge reset has been the method of choice with energy dispersive solid state X-ray detection appliances—including Si (Li) detectors, PIN diodes etc.—for many years now. Also Silicon drift detectors with external FET (E-FET SDD) mostly are operated in pulsed charge reset mode. The reason for favouring pulsed charge reset is that means for continuously compensating the detector leakage and signal current without adding additional noise to the critical measurement signal of said detection systems do not exist.

With pulsed reset, the current is allowed to accumulate as a charge on the charge collecting node of the detector until a certain acceptable level is reached, after which the accumulated charge is removed within a relatively short span of time by means of a deliberately increased compensation current.

Different means for introducing the compensation current have been in practical use comprising transistor reset, diode reset, pulsed optical feedback, and pulsed drain feedback.

The inherent loss of useful measurement time and the disturbance of the continuous data stream by the periodic reset periods are in most applications by far outweighed by the improved detector performance, namely energy resolution at high pulse loads, which usually is the primary figure of merit of such detection systems.

Pulsed charge reset approaches classically have been divided into schemas of either resetting charge after each (or a few) hits of a X-ray quantum or resetting only after a relatively long train of events, which—all in all—corresponds to relatively fast or relatively slow triggering of the reset action respectively. The latter procedure is also referred to as ramp-and-neutralising approach.

Practically, only the named ramp-and-neutralising approaches have been of commercial interest, mainly because resetting after each hit of a quantum would waist pulse processing power of the given detector appliance of 50% according to theory and in actual implementations usually much more.

Besides SDD with external FET (E-FET SDD) also SDD with internal FET are know in the art. Practical implementations of pulsed charge reset with commercial SDD have shown limitations of pulse processing power in the range of 100.000 cps, whereas an I-FET SDD detection system inherently can handle more than 1.000.000 cps (in continuous reset mode). This extraordinary pulse processing power is the main advantage of I-FET SDD.

Copying the ramp-and-neutralising approach to silicon drift detectors with internal amplifying FET (I-FET SDD) has been regarded impossible for a long period of time. For instance, Sipilä and Kiuru discuss in US 2005/0285018 A1, which is incorporated by reference herein, that due to stray capacitances inherent to a FET, which change as a function of voltage, applying the ramp-and-neutralise cycle would spread an energy peak obtained as an output of the detector in a hardly predictable manner. Consequently, Sipilä and Kiuru propose controlling means and circuits for resetting charge after (a) each event, (b) a very small number of events or (c) regularly in relatively short periods of time in conjunction with a pulsed drain feedback approach.

SUMMARY OF THE INVENTION

It is an object of the present invention is to provide means and methods for operating an I-FET SDD while conserving (a) the excellent energy resolution characteristics of pulsed reset schemas and (b) the inherent pulse processing power of I-FET SDD systems.

It is another object of the invention to overcome the obstacles identified by Sipilä and Kiuru and to implement means for acceptable ramp-and-neutralising operation.

The present invention solved the problems of the prior art by (i) reducing the voltage dependency and nonlinearity due to the integrated FET to a level that can be handled by a correction schema and (ii) introducing a correction circuits that does not substantially add noise or other kinds of erroneous signals.

According to a first aspect of the invention an energy dispersive X-ray detector appliance is provided, the appliance comprising a silicon drift detector with internal field effect transistor I-FET SDD; a compensation circuit for compensating nonlinearities in the I-FET SDD; and a neutralizing circuit adapted to neutralize accumulated charges in said I-FET SDD comprising means for pulsed reset of the detector appliance.

The present invention provides a ramp-and-neutralize cycled I-FET SDD in which the voltage dependency and nonlinearity due to the integrated FET is reduced via a compensation circuit to a level that can be handled by a correction circuit. The correction circuit does not substantially add noise or other kinds of erroneous signals.

Specific embodiments of the invention are set forth particular in the appended claims.

Said compensation circuit comprises a first feedback loop. The first feedback loop may be a bootstrap circuit or a charge sensitive amplifier circuit.

In an embodiment, the bootstrap circuit may comprise a buffer amplifier, a feedback network and means for applying a bias to the FET of said I-FET SDD. The input of said buffer amplifier may be connected to the source of the FET of said I-FET SDD, the output of said buffer amplifier may be connected to the input of said feedback network, the output of said feedback network being connected to said means for applying a bias being further connected to the drain of the FET of said I-FET SDD.

In another embodiment, the feedback loop is provided by a charge sensitive amplifier circuit, which may comprise an inverting amplifier, a feedback loop and a feedback capacitance. The input of the inverting amplifier may be connected to the output terminal of the FET of said I-FET SDD, i.e. the drain or the source, the gate of the FET being connected to said feedback capacitor being connected to said feedback loop, the output of said amplifier output and said feedback loop being connected to the input of the neutralizing circuit.

The appliance may further comprise a correction circuit for correcting a further source of nonlinearity within the appliance. The correction circuit may be connected to the output of the compensation circuit and the output of the neutralizing circuit.

In a preferred embodiment the correction circuit comprises a nonlinear voltage controlled element, an amplifier, a bypass capacitance, and an inverting buffer. The nonlinear element may be connected on its input to the output of said compensation circuit, the nonlinear element being connected in series to said amplifier and in parallel to said bypass capacitance, wherein the output of said amplifier may be connected to the input of said inverting buffer outputting a compensated and corrected detector signal.

In an embodiment, the correction circuit may further comprise a pulsed clamping circuit being adapted to operate synchronously with the pulsed charge reset of neutralizing circuit. The pulsed clamping circuit comprises a first switch and an adjustable source, the first switch being connected to the output of said neutralizing circuit and the output of said nonlinear element, said first switch in its closing state being connected to said adjustable source being further connected to the output of said inverting buffer.

In a preferred embodiment said neutralizing circuit may comprise a dual-level trigger circuit, a bi-stable element, a second switch and a reset voltage. The dual-level trigger circuit may be connected on its input to the output of said compensation circuit and on its output to said bi-stable element, which may be connected on its output to the gate of the FET of said I-FET SDD via said second switch, the second switch providing said voltage to the gate of the FET in a closed position. The output of the bi-stable element may further be connected to said first switch of said correction circuit for synchronous operation of the correction circuit with the pulsed charge reset of said neutralizing circuit.

Accordingly, a method for pulsed reset neutralization of accumulated charges within an energy dispersive X-ray detector appliance during detection is provided, the detector appliance comprising a silicon drift detector with internal field effect transistor I-FET SDD; a compensation circuit for compensating nonlinearities in the I-FET SDD; and a neutralizing circuit adapted to neutralize accumulated charges in I-FET SDD; the method comprising the steps of: impinging of X-ray quanta on a detector element of I-FET SDD, creating charge carriers within I-FET SDD, accumulating said charge carriers on electrodes of said I-FET SDD, creating a ramp-like output signal of the appliance upon further impinging of X-ray quanta, compensating nonlinearities in the appliance by reducing the voltage dependency of the I-FET SDD, pulsed reset neutralization of accumulated charges in said I-FET SDD via means for pulsed reset of the detector appliance, and continuing detecting impinging X-ray quanta.

Preferably, the creating a ramp-like output signal step and the following compensation step may further comprise the steps of: driving the gate of FET of I-FET SDD to a more negative potential by applying a voltage bias to I-FET SDD, providing a positive signal at an inverting amplifier, stabilizing the FET of I-FET SDD via a feedback loop connected to said inverting amplifier, forcing the output voltage of amplifier towards the positive rail upon repeated impinging of X-ray quanta.

The neutralization step may further comprise the step of, if said output voltage reaches a certain upper threshold (ThH), triggering a trigger circuit, and toogling the state of a bi-stable element, switching a first switch, applying a reset voltage to the I-FET SDD upon switch of said first switch, and continuing the reset process until a lower threshold is reached, whereupon the bi-stable element is again toggled.

A correction of further nonlinearities within said I-FET SDD via nonlinear voltage control using a nonlinear voltage control element may further be advantageously provided. Said further correction may be performed by pulsed clamping using a further switch and an adjustable source being performed synchronously with the pulsed charge reset of the detector appliance.

The invention will be best understood from the following description of specific embodiments when read in connection with the accompanying drawings.

DETAILED DESCRIPTION OF THE INVENTION

Preferred embodiments of the present invention will be described as follows referring to the accompanying drawings.

Figure 1:
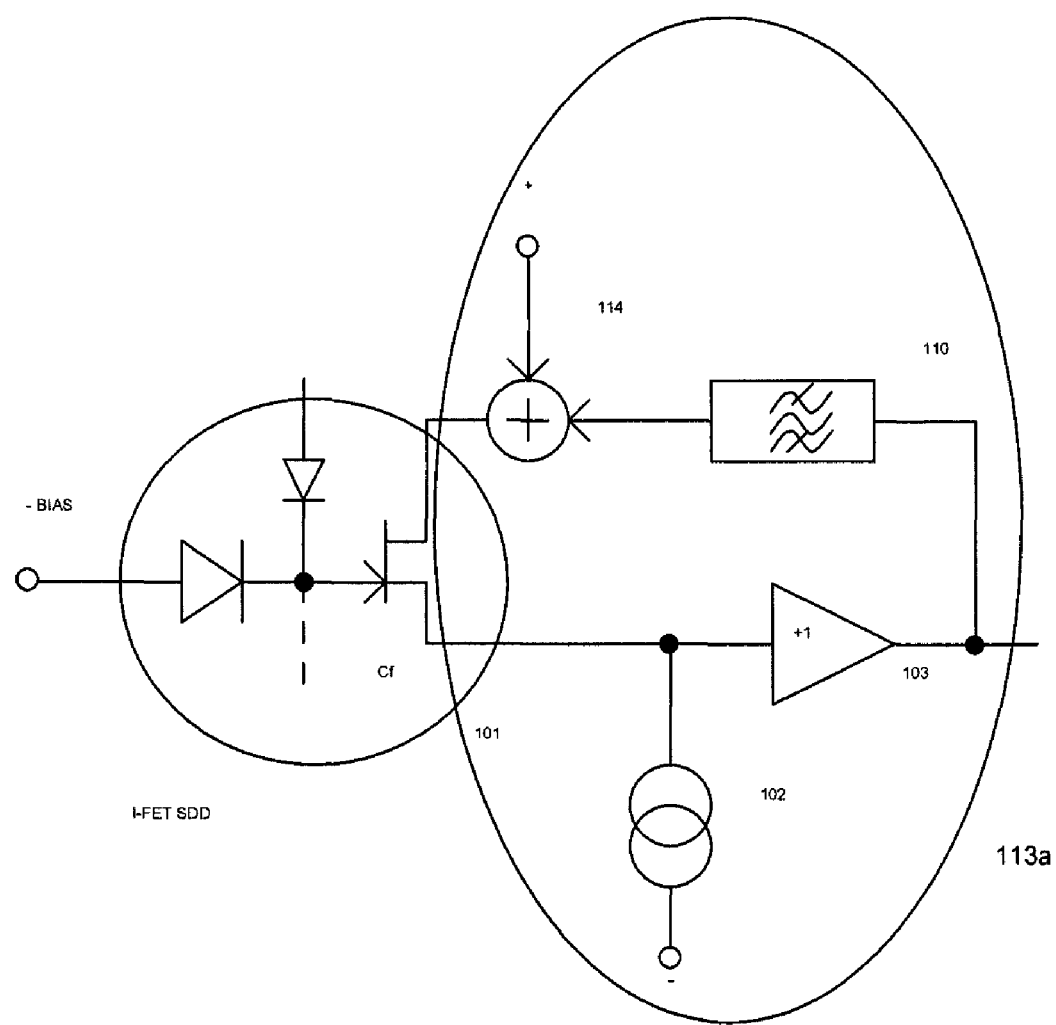
FIG. 1 illustrates a preferred embodiment of the invention with a bootstrap circuit.
Figure 2:
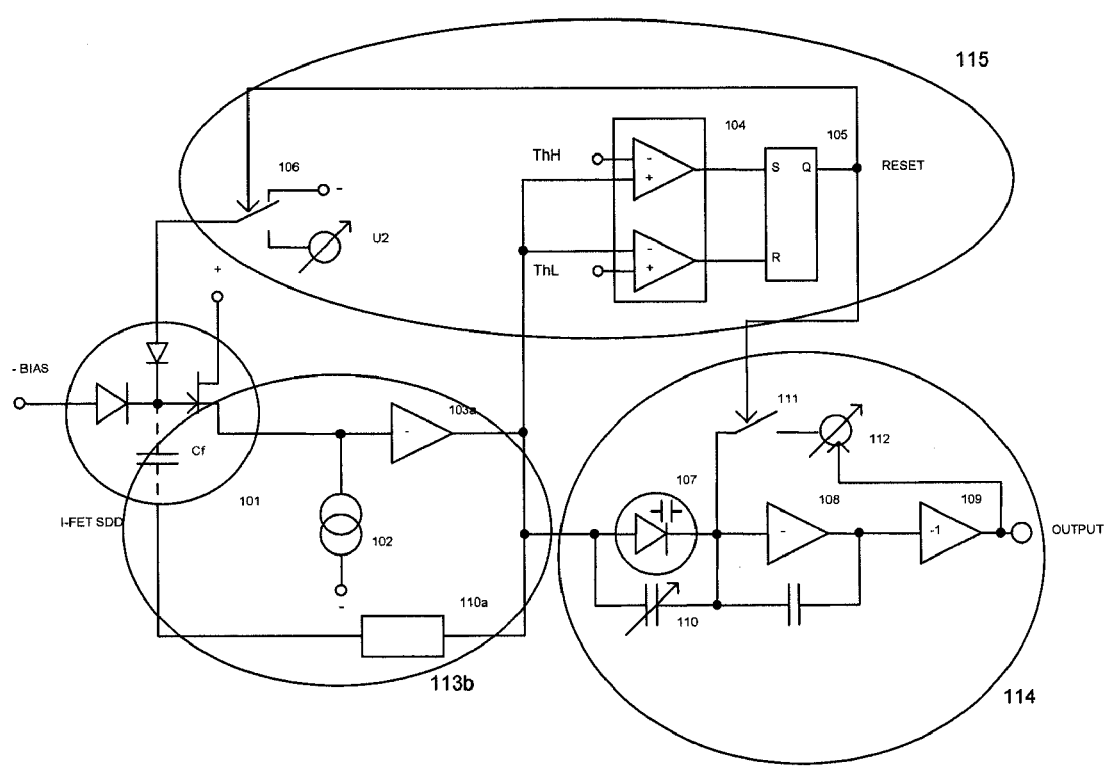
FIG. 2 illustrates an even more preferred embodiment of the invention employing pulsed reset with charge sensitive amplifier (CSA) and a reset-diode.

FIG. 1 and FIG. 2 both show, inter alia, an I-FET SDD 101.

An I-FET SDD 101 comprises a detector diode and an internal field effect transistor FET as an integrated amplifier. The basic semiconductor detecting material is usually silicon, although other materials could be used as well. X-ray quanta hitting the detector diode cause a photoelectric effect, creating a number of electrons and holes. The bias voltage across the detector element guides the electrons and holes to the electrodes. The electrodes of the detector diode change potential and this potential is then transformed into a voltage across a capacitance Cf. The capacitor voltage increases stepwise ramp-manner as x-ray quanta continue to hit the detector diode. The accumulated charge draws the gate potential of the integrated FET into the negative direction. The source potential of the FET mimics the change in the gate potential (source-follower mode). From the source potential a signal can be taken for amplification and detection.

In-depth analysis of the detector surprisingly revealed that the main source of nonlinearity and therefore unpredictability is the drain-to-gate capacitance of the integrated amplifying FET, which acts as a bypass for the signal charge to be measured. The actual capacitance value varies in a hardly controllable way with drain voltage, gate voltage, and certain other influences.

The present invention solves the problems of the prior art by:

(i) reducing the voltage dependency and nonlinearity due to the integrated FET via a compensation circuit to a level that can be handled by a correction circuit, and (ii) introducing correction circuits that do not substantially add noise or other kinds of erroneous signals.

A compensation circuitry according to item (i) would include means for reducing the voltage dependency and nonlinearity by keeping the voltage between gate and drain of the FET of the I-FET SDD 101 constant which could be established by a bootstrap circuit in FIG. 1 or a charge sensitive amplifier in FIG. 2. However, other circuitries are possible.

The correction circuit relies on a nonlinear voltage controlled circuit component and is shown in FIG. 2 only. Yet, it should be understood that the same or a similar circuit could be applied to FIG. 1 as well. Any broadening of recorded peaks of the detector over the length of the ramp is prevented by the appropriate correction circuitry.

The following paragraphs describe the compensation circuit of the inventive detector appliance in more detail before the second part, the correction circuit is explained.

Typically the internal FET of an SDD is operated in source-follower mode. According to one aspect of the invention the effect of the drain-to-gate capacitance can be masked by an arrangement in other scopes known as bootstrap circuit, as shown in FIG. 1.

The function of the circuit shown in FIG. 1 is to keep the voltage between gate and drain of the FET within detector 101 at a constant level with respect to the signal pass band, whereby a capacitance across these terminals of whatsoever value would be rendered ineffective. The stray capacitances not masked by the bootstrap circuit do also depend on the voltage nonlinearly, however signal distortion is reduced to a level that can be compensated by a further correction circuit.

A typical bootstrap circuit would include a buffer amplifier 103 a feedback network 110 adapted to prevent oscillation and ringing, and means 114 for applying a necessary bias to the FET within detector 101.

In a typical realisation according to FIG. 1 a unity gain buffer amplifier 103 is connected to the source of the FET within detector 101. A current source 102, which may also be implemented in form of a resistor of sufficient resistance also connects to the source node of the FET. The output of buffer amplifier 103 is connected to the feedback network 110 which provides the AC part of the control voltage to be applied to the drain of the FET within detector 101. The AC voltage is overlaid by a DC voltage, which in FIG. 1 is depicted by adder 114. In a practical realisation, adder 114 may be realised as an active circuit or an additional simple RC network. In FIG. 1 the output of buffer amplifier 103 further connects to the following stages of the signal processing chain, whereas in principle also the signal on the source of the FET can be feed forward to the signal processor.

With the detector in operation all changes or fluctuations of the source voltage of the FET within detector 101 are mirrored to the output of buffer amplifier 103, which isolates the FET from the load formed by the feedback network and following amplifier stages. Since the buffer amplifier 103 provides a high impedance input, the FET DC operating current is bypassed via the current source 102. Feedback network 110 removes the DC and low frequency signal parts which are out of interest for spectral signal processing. The remaining AC component plus a DC offset to set the working point of the FET is coupled to the drain of the FET within detector 101 in a way that the AC signal on the drain equals the AC signal on the source. Thus the AC voltage across the drain-source capacitance, and thereby also the AC current through said capacitance, is reduced to zero.

Another embodiment of masking different stray capacitances within a detector arrangement is the so-called charge sensitive amplifier CSA circuit. The basic approach is depicted in FIG. 2 as a best mode of the present invention.

The CSA integrates week charge pulses and converts them into voltage pulses for amplification using a feedback capacitance Cf. Because of this operation, this type of amplifier is called a charge sensitive amplifier. The charge sensitive amplifier in FIG. 2 comprises an inverting amplifier 103a, a feedback network 110a and a feedback capacitance Cf within the SDD 101. The CSA establishes a feedback loop with a capacitive feedback element Cf.

Provided the inverting amplifier 103a is of infinite gain, the overall sensitivity of the circuit in terms of output voltage per unit of input charge is completely defined by the value of feedback capacitance Cf. Because of this advantage, CSA is state-of-the-art with prior EDS detector appliances.

For technical reasons Cf cannot be implemented in appropriate manner in the case of I-FET SDD.

Instead, a parasitic capacitance of one of the several auxiliary terminals is used. Those capacitances mainly are formed by rectifying junctions—again the capacitance is inherently voltage depended in a nonlinear way. This has limited the use of CSA in connection with I-FET SDD to low or medium count-rate applications and continuous charge reset schemas. A special selection of terminals or combinations thereof allows reducing the dependencies to a level applicable to subsequent correction, also with ramp-and-neutralising cycles.

Having described the compensation circuit in more detail, a detailed description of the inventive correction circuit correction further nonlinearities will follow.

In the quasi stationary case the necessary correction circuit could be formed by a so-called voltage controlled amplifier VCA which is readily available as a component. The nonlinear control function with respect to the ramp signal in principle can be provided in the necessary form by an analogue signal former or digitally stored parameter fields.

However, EDS detectors are often used in conjunction with fast scanning applications, e.g. elemental mapping. In addition to statistical variations of the input signal the scanning process does prevent a stationary signal. Signal analysis revealed that in this case the control voltage cannot be separated from the signal because both parts severely overlap in the time domain as well as in the frequency domain.

Without the possibility of processing the control signal separately, a nonlinear ultra low-noise broadband amplifier with exactly the opposite characteristics than the detector itself would be necessary to compensate the original signal distortion. The common approach to form a random monotonic transfer function is the well known resistor-diode ladder. Even if in principle applicable, practical implementation would either add to much noise or to much distortion by imperfect approximation of the desired transfer function, as can be derived from according calculations.

Other nonlinear components, as FET's etc. have been considered but usually found neither stable nor well enough defined. Here also the ultra low noise issues are the prominent obstacle.

One possible implementation of a nonlinear amplifier is a capacitive feedback circuit whereby the input capacitor partly is replaced by a variable capacitance component (varicap). Advanced varicaps 110 are mostly known from tuning circuits of digitally controlled radio, and because of this application specially designed with respect of stability and predictability of parameters. Moreover a properly biased varicap can be considered a noiseless circuit component.

By detailing the design it turns out that for restoring the charge on the summing node of the nonlinear amplifier the like limitations exist as originally with continuous reset detectors: either to much noise is added or an undesired pole is formed that would cause ringing and possibly oscillation.

According to a further aspect of the invention this problem is solved by applying pulsed reset also to the correction amplifier circuit.

A preferred embodiment of the inventive compensation, correction and neutralization circuits are shown FIG. 2, which will now be described in detail.

FIG. 2 shows an energy dispersive X-ray detector appliance comprising an I-FET SDD 101, an compensation circuit 113, a correction circuit 114 and a pulsed reset neutralizing circuit 115.

The compensation circuit 113 comprises an inverting amplifier 103a, a feedback loop 110a and an inherent parasitic feedback capacitance Cf connected to the gate of the internal FET of the I-FET SDD 101. The correction circuit 114 comprises a nonlinear element 107, an amplifier 108, a bypass capacitance 110, and an inverting buffer 109. Optionally, it may also comprise a switch 111 and an adjustable source 112. The neutralising circuit 115 comprises a dual-level trigger circuit 104, a bi-stable element 105, a switch 106 and a reset voltage U2.

The gate of the internal FET of the I-FET SDD 101 is connected to feedback capacitance Cf of the compensation circuit. The source of the compensation circuit is connected to the input of amplifier 103a of the compensation circuit 113. The output of amplifier 103a is connected the input of the correction circuit 114 and the input of the neutralizing circuit 115. The output of the correction circuit 114 is the output of the whole circuit. The output of the bi-stable element 105 of the neutralizing circuit 115 may optionally be connected to switch 111 of the correction circuit 114. Switch 106 of the neutralizing circuit 115 is connected to the gate of the FET of I-FET SDD 101.

However, at this point it is pointed out that amplifier 103a may also be connected to the drain of the FET of said I-FET SDD 101 instead of the source. In general, amplifier 103a is connected to an output terminal of the FET of the I-FET SDD. Thus, wherever a connection to the source of the FET is realized in the scope of the present invention, such connection is more generally a connection to the output terminal of the I-FET SDD 101.

The output of the SDD 101 in FIG. 2, in this example the source contact of the internal FET, is connected to an inverting amplifier 103a of very high gain. Amplifier 103a is connected via a feedback network 110a to a suitable terminal of the SDD, which may be the drain or the source, to form a charge sensitive amplifier CSA. All terminals of the SDD are properly biased, exemplary the drain of the FET and the high voltage bias of the detector diode are shown.

The output signal of amplifier 103a is coupled to a neutralising circuit 115 comprising a dual-level trigger circuit 104 which drives a bi-stable element 105. The bi-stable element in turn drives a switch that connects the reset terminal of SDD 101 either to a bias voltage in a measuring mode or a voltage adjusted in a way that the charge accumulated in the detector is effectively reset in a reset mode.

The output of amplifier 103a is further connected to the inventive correction circuit comprising a correction amplifier, mainly consisting of the nonlinear element 107, amplifier 108 and a feedback capacitance. The summing node of the network is connected to a further switch 111, which is operated synchronously to reset switch 106. To allow adjusting the slope and curvature of nonlinear element 107 to the nonlinearity of the detector element additional network components are provided, which are symbolized by adjustable bypass capacitance 110 and offset voltage source 112.

The output of the correction network is connected to an inverting buffer 109 to provide a standard positive going output signal for further processing.

During operation, an X-ray quantum or energetic charged particle hitting the detector diode of SDD 101 releases a certain amount of charge that, forced by the applied high voltage bias, is driving the FET of the detector to a more negative potential. The inverting amplifier 102 reacts with a positive going signal, which, because of the feedback loop 110a, stabilizes exactly when the original charge impulse is compensated by an according voltage across feedback capacitance Cf. The summing node forms a virtual ground.

Repeated quanta—as well as detector diode leakage current—gradually forces the output voltage of amplifier 103a toward the positive rail; the individual steps of that ramp forming the actual measuring signal. This process is continued until the output voltage of said amplifier reaches a certain upper threshold ThH, by which time trigger circuit 104 triggers, toggling the state of the bi-stabile element 105.

Subsequently, switch 106 initiates the reset phase by applying a properly adjusted reset voltage to the reset terminal of the SDD. The feedback loop reacts to the increased current flowing into the summing node by a—relatively steep—negative ramp. The reset process is continued until the output voltage of amplifier 103a falls below the lower threshold ThL, whereupon the bi-stable element 105 again is toggled—the whole cycle starts anew.

During operation thus a saw-tooth voltage can be observed on output of amplifier 103a and consequently also on the signal output. Thereby the positive going slope consists the actual measuring time; during the subsequent negative reset slope the measurement channel is disabled by according means within the connected spectroscopy pulse processor.

The operation corresponds to the known ramp-and-neutralize cycle allowing ramp length of several hundred events.

Because of the inevitable voltage dependence of feedback capacitance Cf within an I-FET SDD the loop gain of the primary feedback loop varies over the length of the positive ramp. Without proper correction this would mean that a peak recorded in an X-ray spectrum would smear over the energy axis or at least broaden in a non-Gaussian fashion. To prevent this nonlinear element 107 of the correction network is adapted to undergo similar changes as the feedback capacity within the SDD 101 over the whole span of the ramp.

Because of imperfections, mainly the bias current of amplifier 108 and the leakage current of then nonlinear element 107, the voltage level of a purely capacitive correction network would slowly drift toward one of the supply rails. In order to stabilize the output without adding noise or any unacceptable distortion in the transfer function, adjustable source 112 and switch 111 provide a pulsed voltage clamping, which is operated synchronous to the charge restoration within the detector element. In other words, the correction network is running free during the measurement periods; the starting voltage level of the ramp is reclaimed during each reset period.

The present invention has been described in an embodiment with CSA and diode feedback. Nonetheless the basic ideas can be applied also to other arrangements, e.g. pulsed drain feedback or source follower read out with bootstrap circuit.

What is claimed is:

1. An energy dispersive X-ray detector appliance comprising:
    a silicon drift detector with internal field effect transistor I-FET SDD,
    a compensation circuit for compensating nonlinearities in the I-FET SDD, and
    a neutralizing circuit adapted to neutralize accumulated charges in said the I-FET SDD comprising means for pulsed reset of the detector appliance,
    wherein said compensation circuit comprises a first feedback loop which is a charge sensitive amplifier circuit,
    wherein the current amplifier circuit comprises an inverting amplifier, a feedback loop and a feedback capacitance and
    wherein an input of the inverting amplifier is connected to an output terminal of the FET of the I-FET SDD, a gate of the FET being connected to the feedback capacitor being connected to the feedback loop, the output of said amplifier output and said feedback loop being connected to the input of the neutralizing circuit.

2. The detector appliance according to claim 1, wherein the first feedback loop is a bootstrap circuit.

3. The detector appliance according to claim 2, wherein the bootstrap circuit comprises a buffer amplifier, a feedback network and means for applying a bias to the FET of said I-FET SDD.

4. The detector appliance according to claim 3, wherein the input of said buffer amplifier is connected to the source of the FET of said I-FET SDD, the output of said buffer amplifier is connected to the input of said feedback network, the output of said feedback network being connected to said means for applying a bias being further connected to the drain of the FET of said I-FET SDD.

5. The detector appliance according to claim 1, wherein the appliance further comprises a correction circuit for correcting a further source of nonlinearity within the appliance.

6. The detector appliance according to claim 5, wherein the correction circuit is connected to the output of the compensation circuit and the output of the neutralizing circuit.

7. The detector appliance according to claim 6, wherein the correction circuit comprises a nonlinear voltage controlled element, an amplifier, a bypass capacitance, and an inverting buffer.

8. The detector appliance according to claim 7, wherein nonlinear element is connected on its input to the output of said compensation circuit, the nonlinear element being connected in series to said amplifier and in parallel to said bypass capacitance, wherein the output of said amplifier is connected to the input of said inverting buffer outputting a compensated and corrected detector signal.

9. The detector appliance according to claim 7, whereby the correction circuit further comprises a pulsed clamping circuit being adapted to operate synchronously with the pulsed charge reset of neutralizing circuit.

10. The detector appliance according to claim 9, wherein said pulsed clamping circuit comprises a first switch and an adjustable source, the first switch being connected to the output of said neutralizing circuit and the output of said nonlinear element, said first switch in its closing state being connected to said adjustable source being further connected to the output of said inverting buffer.

11. The detector appliance according to claim 1, wherein said neutralizing circuit comprises a dual-level trigger circuit, a bi-stable element, a second switch and a reset voltage.

12. The detector appliance according to claim 11, wherein the dual-level trigger circuit is connected on its input to the output of said compensation circuit and on its output to said bi-stable element, which is connected on its output to the gate of the FET of said I-FET SDD via said second switch, the second switch providing said voltage to the gate of the FET in a closed position.

13. The detector appliance according to claim 12, wherein the output of bi-stable element is further connected to said first switch of said correction circuit for synchronous operation of the correction circuit with the pulsed charge reset of said neutralizing circuit.

14. Method for pulsed reset neutralization of accumulated charges within an energy dispersive X-ray detector appliance during detection, the detector appliance comprising a silicon drift detector with internal field effect transistor I-FET SDD; a compensation circuit for compensating nonlinearities in the I-FET SDD; and a neutralizing circuit adapted to neutralize accumulated charges in I-FET SDD; the method comprising the steps of:
    impinging of X-ray quanta on a detector element of I-FET SDD,
    creating charge carriers within I-FET SDD,
    accumulating said charge carriers on electrodes of said I-FET SDD,
    creating a ramp-like output signal of the appliance upon further impinging of X-ray quanta,
    compensating nonlinearities in the appliance by reducing the voltage dependency of the I-FET SDD,
    pulsed reset neutralization of accumulated charges in said I-FET SDD via means for pulsed reset of the detector appliance, and
    continuing detecting impinging X-ray quanta.

15. The method according to claim 14, wherein the creating a ramp-like output signal step and the following compensation step further comprise the steps of:
    driving the gate of FET of I-FET SDD to a more negative potential by applying a voltage bias to I-FET SDD,
    providing a positive signal at an inverting amplifier, stabilizing the FET of I-FET SDD via a feedback loop connected to said inverting amplifier, and forcing the output voltage of amplifier towards the positive rail upon repeated impinging of X-ray quanta.

16. The method according to claim 14, the neutralization comprising the step of if said output voltage reaches a certain upper threshold (ThH), triggering a trigger circuit, toogling the state of a bi-stable element, switching a first switch, applying a reset voltage to the I-FET SDD upon switch of said first switch, and continuing the reset process until a lower threshold is reached, whereupon the bi-stable element is again toggled.

17. The method according to claim 14, wherein the method further includes the correction of further nonlinearities within said I-FET SDD via nonlinear voltage control using a nonlinear voltage control element.

18. The method according to claim 17, wherein the further correction is performed by pulsed clamping using a further switch and an adjustable source being performed synchronously with the pulsed charge reset of the detector appliance.

* * * * *